F. B. HULL.
STORM HOOD FOR VEHICLES.
APPLICATION FILED SEPT. 15, 1914. RENEWED JAN. 8, 1917.

1,236,439.

Patented Aug. 14, 1917.
2 SHEETS—SHEET 1.

WITNESSES
F. D. Sweet
Geo. L. Beeler

INVENTOR
Firman B. Hull
BY
ATTORNEYS

F. B. HULL.
STORM HOOD FOR VEHICLES.
APPLICATION FILED SEPT. 15, 1914. RENEWED JAN. 8, 1917.
1,236,439.
Patented Aug. 14, 1917.
2 SHEETS—SHEET 2.
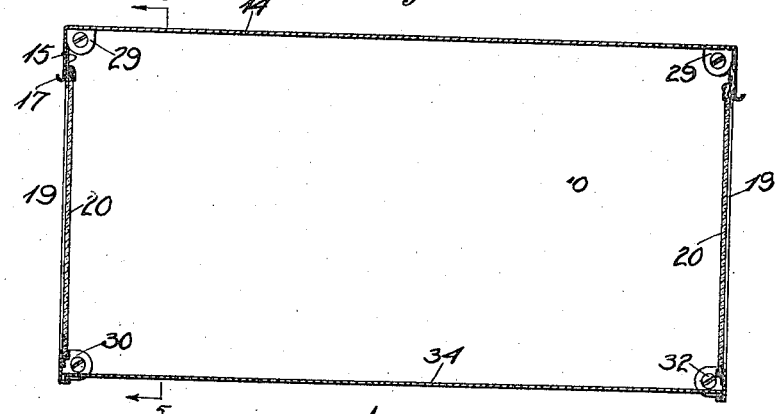
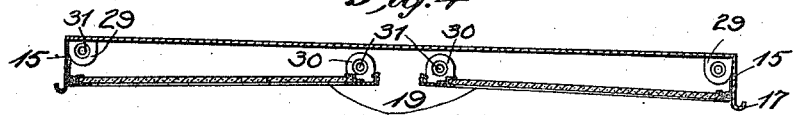
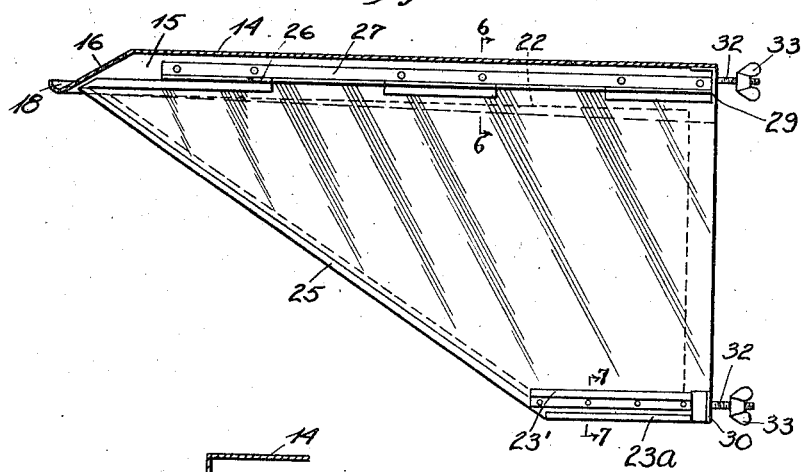
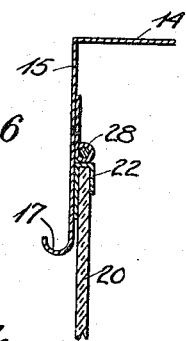
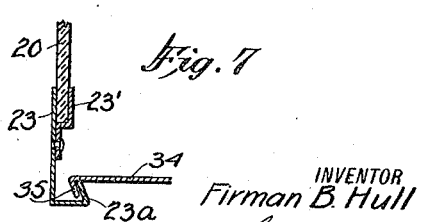
WITNESSES
INVENTOR
Firman B. Hull
BY
ATTORNEYS

UNITED STATES PATENT OFFICE.

FIRMAN B. HULL, OF HARRISON, NEW JERSEY.

STORM-HOOD FOR VEHICLES.

1,236,439.  Specification of Letters Patent.  Patented Aug. 14, 1917.

Application filed September 15, 1914, Serial No. 861,783. Renewed January 8, 1917. Serial No. 141,340.

*To all whom it may concern:*

Be it known that I, FIRMAN B. HULL, a citizen of the United States, and a resident of Harrison, in the county of Hudson and State of New Jersey, have invented a new and Improved Storm-Hood for Vehicles, of which the following is a full, clear, and exact description.

This invention relates to high speed vehicles, and has particular reference to attachments for use in connection with automobiles, railway cars or the like, for the purpose of facilitating their operation in inclement weather.

More particularly the invention comprises a peculiar construction of hood or guard adapted especially for connection to the wind shield of an automobile for the purpose of preventing rain or snow from obstructing the vision through the wind shield, and also to provide or allow safe and convenient driving and to avoid uncomfortable and dangerous drafts resulting from the use of wind shields of which the upper parts are turned or thrown up in the case of storm to give an unobstructed vision.

The foregoing and other objects of the invention will hereinafter be more fully described and claimed and illustrated in the drawings forming a part of this specification in which like characters of reference indicate corresponding parts in all the views, and in which—

Fig. 3 is a vertical transverse section on the line 3—3 of Fig. 2;

Fig. 4 is a view similar to Fig. 3, but indicating the parts in folded position;

Fig. 5 is a vertical longitudinal section on the line 5—5 of Fig. 3, the wind buffer being omitted from the bottom of the structure; and Figs. 6 and 7 are detail sectional views on the corresponding lines of Fig. 5.

Figure 1:
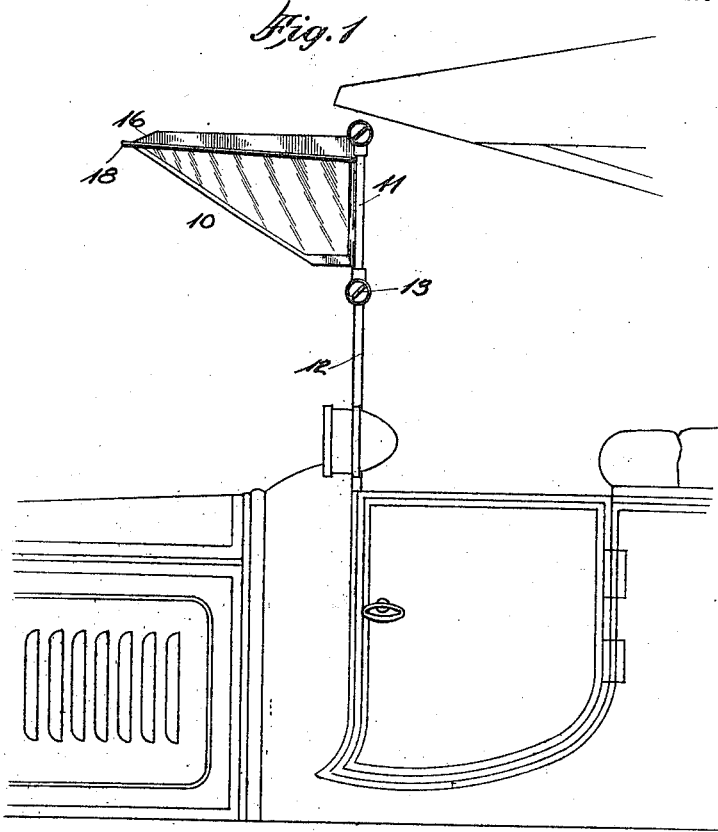
Figure 1 is a diagrammatic view of a portion of the left side of an automobile, to the wind shield of which is secured my improvement.
Figure 2:
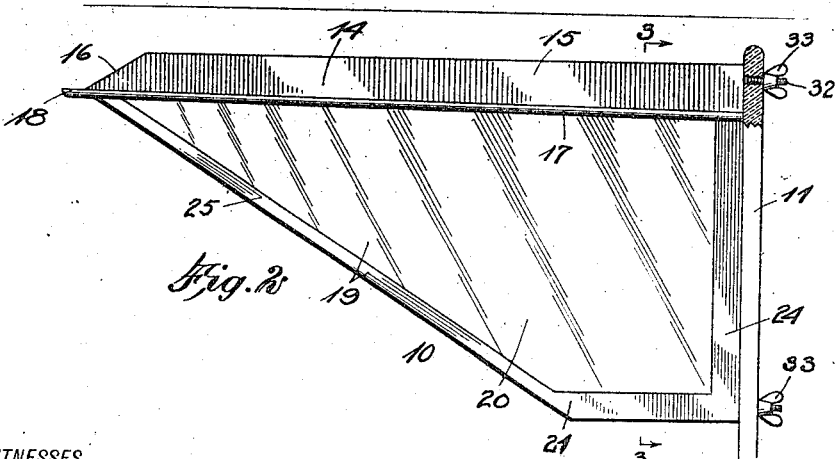
Fig. 2 is a side elevation, on a larger scale, of the hood.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings in which the invention is shown for illustration as connected to an automobile, the front 10 is shown connected to the wind shield 11 made usually of glass and pivotally connected to the lower portion 12 at 13. The wind shield is or may be of any well known construction.

The hood includes, in its preferred form, a top 14, the main portion of which is substantially flat but provided on its sides with vertical flanges 15 and at its front with a downwardly inclined or beveled flange 16. The side flanges 15 are wider at the rear ends than at their front ends whereby the lower edges thereof are inclined downwardly toward the rear. Each of these side flanges terminates at its lower edge in an upturned lip forming a gutter 17, and a similar gutter 18 along the lower edge of the front flange 16 communicates with the two side edges. Any rain water from the top 14 is conveyed rearwardly from the hood top along said gutters.

Each side member 19 preferably comprises a glass insert 20 or other suitable transparency fitted in any suitable manner in a metallic rim 21 of trapezoidal form. In other words, the rim 21 comprises parallel upper and lower bars 22 and 23, a rear vertical bar 24 and a forwardly and upwardly inclined bar 25. The bar 22 is preferably bent inwardly and downwardly over the transparency, as shown in Fig. 6, and an auxiliary bar 23' coöperates with the lowermost bar 23 to hold the transparency in place. Each of the side members 19 is hinged along a horizontal axis in the inner face of the top side flange 15 so as to fold inwardly and upwardly, as shown in Fig. 4, when the hood is not in use. The hinge is constituted by portions of the bar 22 projecting upwardly between knuckles 26 of the hinge member 27 secured permanently along the inner face of said side flange 15. These parts are connected by means of a pivot rod 28. See Fig. 6. The side members 19 are of a width or height slightly less than half the width of the top, and hence are adapted to nest freely within the top, as shown in Fig. 4.

The rear as well as the front of the hood is open and is adapted to be secured squarely against the front face of the shield member 11. As a convenient and efficient means for securing the hood thus in position, I provide pairs of ears or lugs 29 and 30, the former being connected rigidly to the rear portion of the top and the latter being carried by the free ends of the bottom bars 23. Each of these ears has a hole 31 through which the screw or bolt 32 passes rearwardly through a corresponding hole formed in the wind sheld 11. The hood is then secured in place by a winged nut 33 for each of said bolts.

At 34 I show a wind buffer extending across the bottom of the hood just in front of the shield 11 for the purpose of preventing an air current up or down within the hood. This member is provided with downwardly extending flanges 35 which engage over and interlock with upwardly turned flanges 23ª of the bars 23 at the lower edges of the side wings. This member 34, therefore, constitutes a reinforcement or brace for the lower part of the hood extending, as it does, between the lower edges of the side wings which would otherwise be free except for the connections through the ears 30. When the hood is not needed, as in fair weather, it may be quickly and readily removed from the wind shield by removing the nuts 33, when the hood is slipped freely from the wind shield, and after the wind buffer 34 is withdrawn from its position, the side members 19 fold up as shown in Fig. 4, when the device will be in position or form for slipping beneath a seat or in any other small space.

I claim:—

1. The herein described storm hood comprising a top member, the main portion of which is flat and horizontal but having vertical side flanges, a pair of wings hinged to the inner faces of said side flanges and movable upwardly around the hinge pivots into the space between said side flanges, and means to maintain said side flanges in rigid vertical position parallel to each other.

2. In a storm hood, the combination of a top member having side flanges, a pair of side members pivoted on horizontal pivots to the side flanges and movable upwardly toward each other within the space between said side flanges, means to secure the hood in position for use on the front face of a wind shield, and a wind buffer having interlocking connection between the lower edges of the side members of the hood and serving to stiffen the same.

In testimony whereof I have signed my name to this specification in the presence of two subscribing witnesses.

FIRMAN B. HULL.

Witnesses:
GEO. L. BEELER,
PHILIP D. ROLLHAUS.